(No Model.)
H. O. THOMAS.
CANT HOOK.
No. 534,703. Patented Feb. 26, 1895.
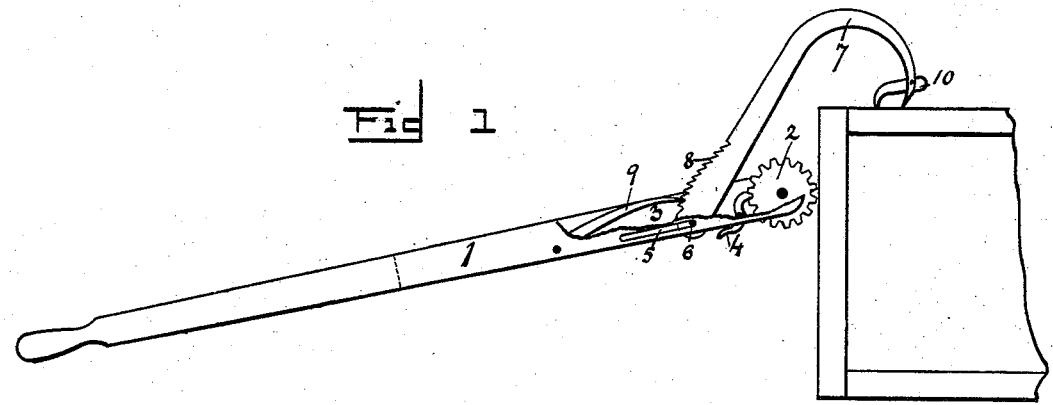
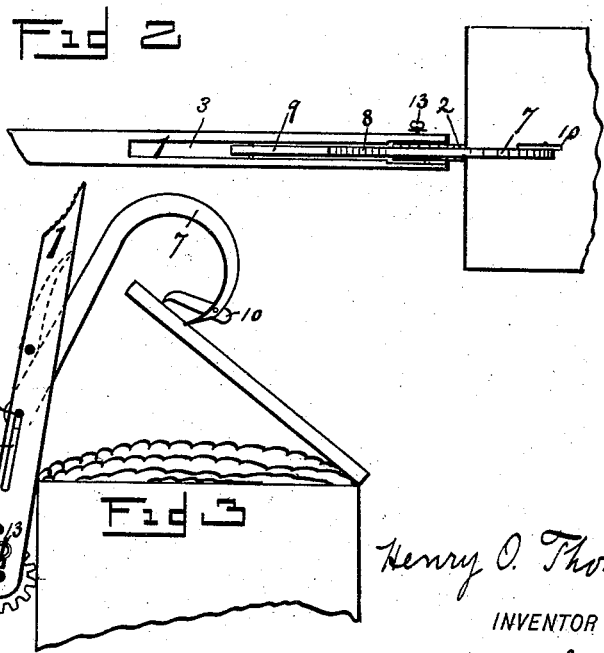
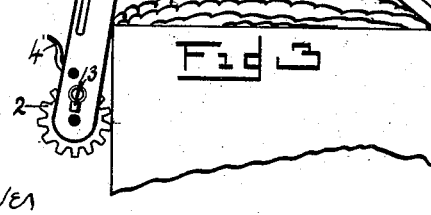
Henry O. Thomas
INVENTOR
BY C. N. Sues
ATTORNEY.

UNITED STATES PATENT OFFICE.

HENRY O. THOMAS, OF KIMBALL, NEBRASKA.

CANT-HOOK.

SPECIFICATION forming part of Letters Patent No. 534,703, dated February 26, 1895.

Application filed June 19, 1893. Serial No. 478,205. (No model.)

*To all whom it may concern:*

Be it known that I, HENRY O. THOMAS, of Kimball, in the county of Kimball and State of Nebraska, have invented certain useful Improvements in Cant-Hooks; and I do hereby declare that the following is a full, clear, and exact description of the invention, such as will enable others skilled in the art to which it appertains to make and use the same, reference being had to the accompanying drawings, which form a part of this specification.

This invention has relation to a new and novel cant hook, which is adapted to be used, not only in handling large logs and boxes, but which is also peculiarly adapted to be used in closing and securing the lids of boxes which are to be, in closing, pressed down upon the material within the box. By means of my improved hook, the lid of the box may be securely held in position while the box is bound or the lid is secured by means of nails or the strap iron usually employed.

In the accompanying drawings, Figure 1 shows my improved cant hook in a position as holding down the lid of a box, which lid is adapted to be properly secured. Fig. 2 shows a top view of my improved cant hook, and Fig. 3 shows the first position of the hook as secured to a lid which is pressed upward by the material in the box.

1 indicates an ordinary bar, preferably of wood, and of any suitable length, which is slotted at its lower end and provided with the steel fulcrum wheel 2, which is preferably toothed, as shown. Working within the slot 3 of the bar and adapted to engage the teeth of the fulcrum wheel is a gravity actuated dog 4, adapted to engage the teeth of the wheel 2.

At a suitable point, preferably near one edge, the bar 1 is provided with the slot 5 which extends through, from side to side, and is adapted to hold the pin 6, of a suitable size and material, and giving support to the cant hook 7 which is secured to this supporting pin 6. This hook 7 is of a proper size, and is provided upon the rear with the notched rack 8 extending in a curve, and is adapted to be engaged by the pawl 9, which is pivoted at the upper end within the slot 3, which extends upward a suitable distance as shown in Fig. 2. The pawl 9 is adapted to lie either forward or backward within the slot 3 of the bar 1 proper, as may be seen in Fig. 3, where the pawl is shown in its upward position so as to allow the cant hook to be carried to the upper end of the slot 5 and so give a proper purchase. To aid the cant hook in grasping the lid or other material to be operated upon, I provide the additional cant-dog, 10, which I pivotally secure to the end of the cant hook proper, which, as the hook is drawn downward, is forced into the wood so as to distribute the grasping surface of the hook.

The operation of my device is as follows: The wheel 2, which revolves freely within the lower end of the bar 1 is brought to the side of the box or the log to be used, while the bar 1 is held in an approximately vertical position. In securing a box lid, for instance: as shown in Fig. 3, the hook 7 would be dropped upon the lid and secured. The hook 7 is in its upward position, being in the upper end of the slot 5. When the bar 1 is drawn downward the hook is fed toward the pivot wheel 2 until it is closed. By means of the rolling of the fulcrum wheel 2, the hook can be gradually fed down to the top of the box and finally when the proper position has been reached the hook may be locked by means of the pawl 9 feeding into the rack 8. If it should be desired to loosely work the hook upon the box or log to be operated, it would simply be necessary to disengage the tooth wheel 2. This wheel, however, can be locked at any minute when it is desired to provide a fixed fulcrum point.

In my present invention I have shown the rack 8, which I employ in fixing the cant hook 7, in relation to the bar 1. I could, however, use any other simple retaining device, such as a clamp ring to secure this hook.

Secured to either side of the bar 1, preferably at its lower end, is an ordinary wire clamp 13, which is adapted to hold the wire, as the same is being bound around the box, as is ordinarily used in devices of this sort.

The device is noticeable because of its extreme simplicity, and

Having thus described my said invention, what I claim as new, and desire to secure by United States Letters Patent, is—

1. The combination with a suitable bar of a revoluble serrated fulcrum wheel at the lower end thereof, a pawl engaging the serrations of said wheel, and a cant hook movably held within said bar, all substantially as and for the purpose set forth.

2. The combination with a bar of a fulcrum wheel within the lower end of said bar, provided with serrations, a gravity actuated dog adapted to work within the serrations of said fulcrum wheel, a cant hook movably held within said bar and provided with a series of notches and a pawl adapted to engage said notches to lock said cant hook all substantially as and for the purpose set forth.

3. The combination with a suitable bar of a fulcrum wheel, revolubly held within the lower end of said bar, provided with teeth upon its peripheral surface; a gravity actuated dog, adapted to be engaged within said teeth; and a cant hook, adapted to be locked in one direction within said hook in combination with a wire clamp secured to said bar, all substantially as and for the purpose set forth.

In testimony whereof I affix my signature in presence of two witnesses.

HENRY O. THOMAS.

Witnesses:
ALEXANDER MOORE,
GEO. W. SUES.